United States Patent
Sasakura

[11] Patent Number: 5,995,144
[45] Date of Patent: *Nov. 30, 1999

[54] AUTOMATIC FOCUSING DEVICE USING PHASE DIFFERENCE DETECTION

[75] Inventor: Takao Sasakura, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/469,900

[22] Filed: Jun. 6, 1995

Related U.S. Application Data

[63] Continuation of application No. 08/026,604, Mar. 5, 1993, abandoned.

[30] Foreign Application Priority Data

Mar. 10, 1992 [JP] Japan ................................. 4-086538

[51] Int. Cl.⁶ .................................................. H04N 5/232
[52] U.S. Cl. ......................... 348/350; 348/351; 348/354; 396/234
[58] Field of Search .................................... 248/345, 349, 248/350, 351, 232, 354, 355, 356; 358/909.1, 906; 354/402, 406, 407; 396/234, 72, 77, 79–82, 96, 121, 233; H04N 5/76, 5/232

[56] References Cited

U.S. PATENT DOCUMENTS

| | | | |
|---|---|---|---|
| 4,523,829 | 6/1985 | Eguchi et al. | 348/349 |
| 4,843,227 | 6/1989 | Matsui et al. | 354/402 |
| 4,893,202 | 1/1990 | Smith | 360/79 |
| 4,953,029 | 8/1990 | Morimoto et al. | 348/345 |
| 5,107,291 | 4/1992 | Ishida et al. | 396/104 |
| 5,140,360 | 8/1992 | Tsukamoto et al. | 396/76 |
| 5,146,258 | 9/1992 | Bell et al. | 354/432 |
| 5,208,625 | 5/1993 | Suekane | 354/402 |
| 5,262,867 | 11/1993 | Kojima | 348/350 |

*Primary Examiner*—Wendy Garber
*Assistant Examiner*—Ngoc-Yen Vu
*Attorney, Agent, or Firm*—Robin, Blecker & Daley

[57] ABSTRACT

In a still video camera or the like which employs a solid-state image sensor, such as a CCD, a first calculation of the amount of correlation in an AF sensor is executed by using a smaller number of pixels and a larger amount of shifting, and second and subsequent calculations of the amount of correlation are executed by using a larger number of pixels and a smaller amount of shifting. Accordingly, it is possible to reliably detect a large-defocus state through the first calculation, whereby it is possible to omit an unnecessary calculation to reduce the required calculation time. The automatic focusing device uses a phase difference detection method in which a focus state is detected by detecting the deviation between two incident images. The device includes two sensor portions for receiving two images which are each a variable in their image forming portions according to a focus state. The device also includes a correlation computing device for computing the correlation between signals from the two sensor portions by relatively shifting the output signals with a predetermined pitch. The device also includes a driver for driving a focus lens to the in-focus point according to the outputs of the computing device and also includes a control for changing the predetermined pitch with which the output signals of the two sensor portions are shifted.

12 Claims, 9 Drawing Sheets

$V_0 < V_1$ $V_k < V_{max}$

AUTOMATIC FOCUSING DEVICE USING PHASE DIFFERENCE DETECTION

This is a continuation application under 37 CFR 1.62 of prior application U.S. Ser. No. 08/026,604, filed Mar. 5, 1993 (abandoned).

BACKGROUND OF THE INVENTION

1. Field of the Invention

The present invention relates to an image sensing apparatus using a solid-state image sensor such as a charge coupled device (CCD) and, more particularly, to an automatic focusing device based on a phase-difference detection method suitable for use with a still-image recording apparatus, such as a still video camera, for recording a still image.

2. Description of the Related Art

Conventionally, many single-lens reflex types of silver-halide cameras employing silver-halide film have used automatic focusing (AF) devices based on a phase-difference detection method.

Such an AF system based on the phase-difference detection method will be described below with reference to FIGS. 1 to 4 and 7.

FIG. 1 schematically shows an AF optical system. In the shown AF optical system, light incident from a lens 1 passes through a half-mirror 2 and is reflected downward from a submirror 3. The reflected light passes through a primary focal plane "p" and, in turn, passes through an infrared cut filter 4 and a field lens 5 to a secondary imaging lens 6 which is called "spectacle lens". The reflected light is separated into two images A and B by the secondary imaging lens 6. The two images A and B are respectively made incident on sensor elements 7A and 7B of the AF sensor 7 shown in FIG. 2.

Referring to FIG. 2, each of the sensor elements 7A and 7B of the AF sensor 7 is made from a line sensor in which a predetermined number of pixels which are formed by photo-electric conversion elements are arrayed at intervals of a predetermined pitch. Outputs relative to the two images A and B are provided by the two sensor elements 7A and 7B. As shown, if an in-focus state is provided in the primary focal plane "p", the interval between the outputs relative to the respective images A and B is constant at a reference interval $Z_{OH}$. If a near-focus state is provided in the primary focal plane "p", such an interval is narrower than the reference interval $Z_{OH}$, while if a far-focus state is provided in the primary focal plane "p", the interval is wider than the reference interval $Z_{OH}$.

Then, the lens 1 is made to move until the interval $Z_{OH}$ corresponding to the in-focus state is reached, thereby executing focusing. The amount of the movement of the lens 1, i.e., the amount of movement of an image surface, is obtained by calculations using the interval between the two images A and B. The calculations are performed on the basis of the following algorithm.

First, the output of the AF sensor 7 is received as data, and the correlation between the outputs of the two sensor elements 7A and 7B is obtained. The method of obtaining such a correlation is called "MIN algorithm", and if A[1] to A[n] represent the output data of the sensor element 7A and B[1] to B[n] represent the output data of the sensor element 7B, the amount of correlation, "$V_0$", corresponds to the hatched portion of FIG. 3(a). This amount of correlation, "$V_0$", is expressed as:

$$V_0 = \sum_{j=1}^{m} \min(A[j], B[j])$$

(where "min (A, B)" is the smaller value of A and B).

Thus, the amount of correlation, "$V_0$", is calculated. Secondly, as shown in FIG. 3(b), the amount of correlation, "$V_1$", between data obtained by shifting the image A by one bit of the AF sensor 7 and data indicative of the image B is calculated. This amount of correlation, "$V_1$", is expressed as:

$$V_1 = \sum_{j=1}^{m} \min(A[j+1], B[j])$$

In a similar manner, the amounts of correlation, "$V_2$", "$V_3$", . . . , are calculated sequentially.

FIG. 7 schematically shows the manner in which calculating ranges allocated to the respective sensor elements A and B are shifted relative to each other during the process of obtaining the individual amounts of correlation, where it is assumed that the employed AF sensor 7 is made up of 40 pixels, the calculating range allocated to each of the sensor elements A and B is 30 pixels and the maximum amount of shifting (the maximum number of shiftings) is ±10 bits.

During the process of calculating the individual amounts of correlation, "$V_0$", "$V_1$", "$V_2$", "$V_3$", . . . , in the above-described manner, if the two images A and B substantially coincide with each other as shown in FIG. 3(c), the amount of correlation at this time reaches its maximum value $V_{max}$. Thus, from the amount of shifting, "K", at this time and the preceding and succeeding amounts of shifting, "K−1" and "K+1", a true maximum value $V_{maxs}$ and an associated true amount of shifting, "Ks", are obtained by the interpolation method shown in FIG. 4.

Referring to FIG. 4, as the amount of shifting varies in the order of K−1→K, the amount of correlation increases along a line $Q_1$. As the amount of shifting varies in the order of K→K+1, the amount of correlation decreases along a slope $Q_2$. Accordingly, the point at which the lines $Q_1$ and $Q_2$ intersect corresponds to the true maximum value $V_{maxs}$, and the amount of shifting at this time is the true amount of shifting, "Ks", which is obtained as the amount of deviation.

Since the relation between the amount of deviation and the amount of the phase difference between the images A and B, i.e., what is called the amount of defocus, is determined for each individual optical system, the amount of defocus is obtained from the amount of deviation, "Ks". The amount by which the lens 1 is to be moved is obtained from the amount of deviation, "Ks", and the lens 1 is made to move until an in-focus state is reached.

In the above-described case, to maximize the amount of data required to calculate the amounts of correlation, the following sequence has conventionally been executed. First, the number of pixels to be handled in the calculation of the amounts of correlation is increased with the amount of shifting being decreased, and a calculation is performed under these conditions. If the above-described amount of deviation is not obtained in such a first calculation of the amounts of correlation, it is determined that the optical system is in a large-defocus state, and a second calculation of the amounts of correlation is performed. In the second calculation, the number of pixels to be handled in the calculation of the amounts of correlation is decreased with the amount of shifting being increased, and the amount of deviation is detected.

However, in a still video camera for recording a still image by using a solid-state image sensor such as a CCD, if an AF sensor identical to that used in a silver-halide camera is employed, AF accuracy may deteriorate or a contention between far focus and near focus may easily take place. This is because, if such an AF sensor is used in the still video camera, the number of effective pixels of the AF sensor becomes relatively small as compared to the case of the silver-halide camera, and the probability that the optical system is placed in a large-defocus state is high before an in-focus state is reached, i.e., before the lens is moved. For this reason, in the first calculation performed with a smaller amount of shifting and a larger number of pixels, it is substantially impossible to detect the amount of deviation, with the result that the first calculation of the amounts of correlation becomes meaningless.

SUMMARY OF THE INVENTION

An object of the present invention which has been made to solve the above-described problems is, therefore, to provide an automatic focusing device in which it is possible to reduce the time required to calculate the amount of correlation.

To achieve the above object, in accordance with one aspect of the present invention, there is provided an automatic focusing device for use in an image sensing apparatus employing a solid-state image sensor. The automatic focusing device utilizes an AF optical system having an enhanced magnification of image or an AF sensor having a fine pixel pitch. Alternatively, in the automatic focusing device, a first calculation of the amount of correlation is executed by using a smaller number of pixels and a larger amount of shifting, and a lens is driven on the basis of the result of the first calculation. After the lens has been driven, if the amount of correlation need to be again calculated, a calculation of the amount of correlation is executed by using a larger number of pixels and a smaller amount of shifting.

Another object of the present invention is to provide an automatic focusing device in which a first calculation of the amount of correlation is executed by using a smaller number of pixels and a larger amount of shifting so that it is possible to facilitate detection of a large-defocus state, thereby reducing an unnecessary calculation time.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 5:
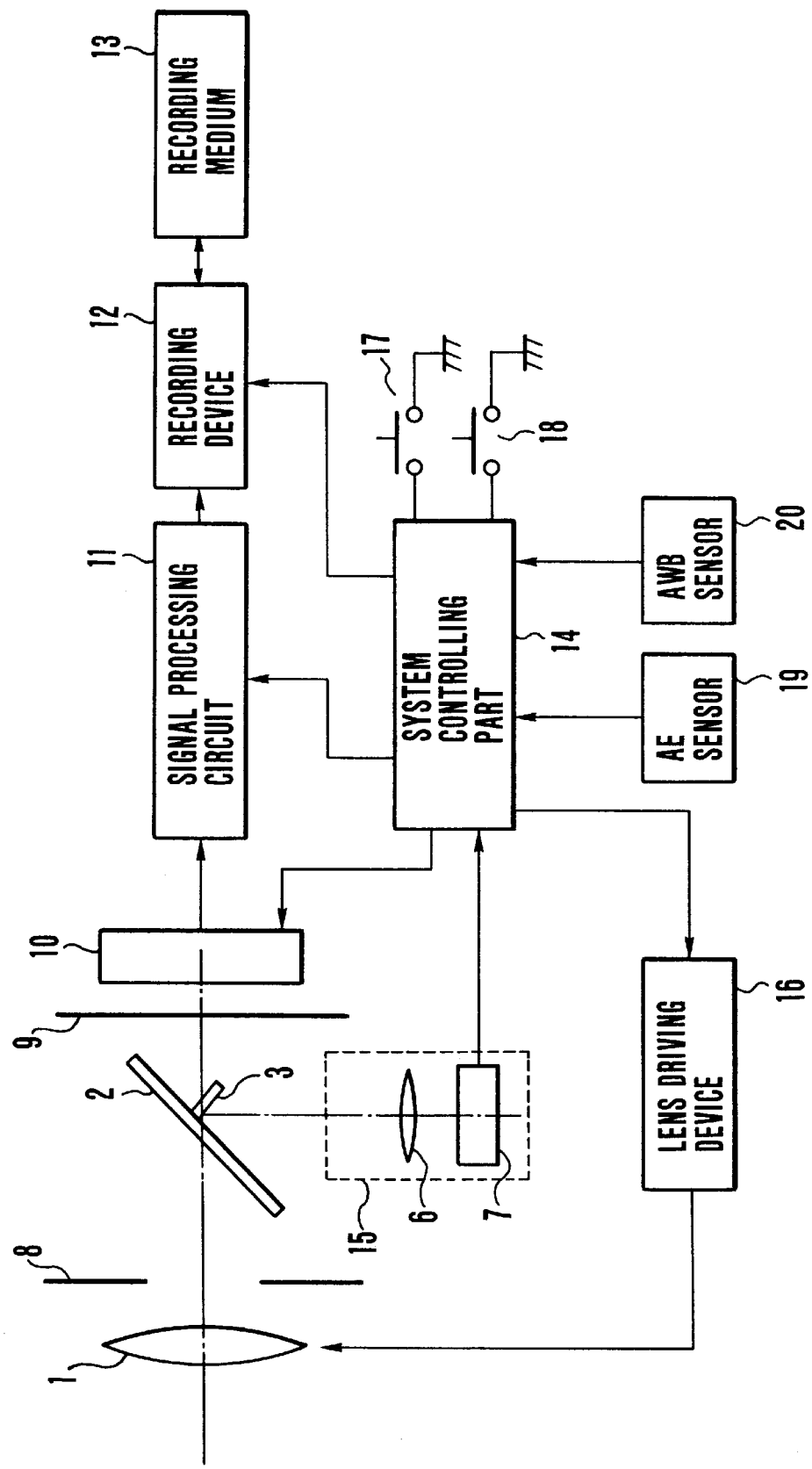
FIG. 5 is a schematic block diagram showing first and second embodiments of the present invention.

FIG. 5 is a schematic block diagram of a first embodiment of the present invention, and shows an arrangement in which the present invention is applied to a still-image recording apparatus, such as a still video camera, which employs an image sensor such as a CCD.

In the first embodiment shown in FIG. 5, light incident from a lens 1 passes through a diaphragm 8, a half-mirror 2 and a shutter 9 and is, in turn, converted into an electrical image signal by an image sensor 10. The electrical image signal obtained from the image sensor 10 is processed by a signal processing circuit 11, and the signal processing circuit 11 outputs a video signal conforming to a predetermined system. The video signal is recorded by a recording device 12 on a recording medium 13 such as a magnetic recording medium or a semiconductor memory device. A system controlling part 14 provides control over the image sensor 10, the signal processing circuit 11, the recording device 12 and other associated parts.

Figure 1:
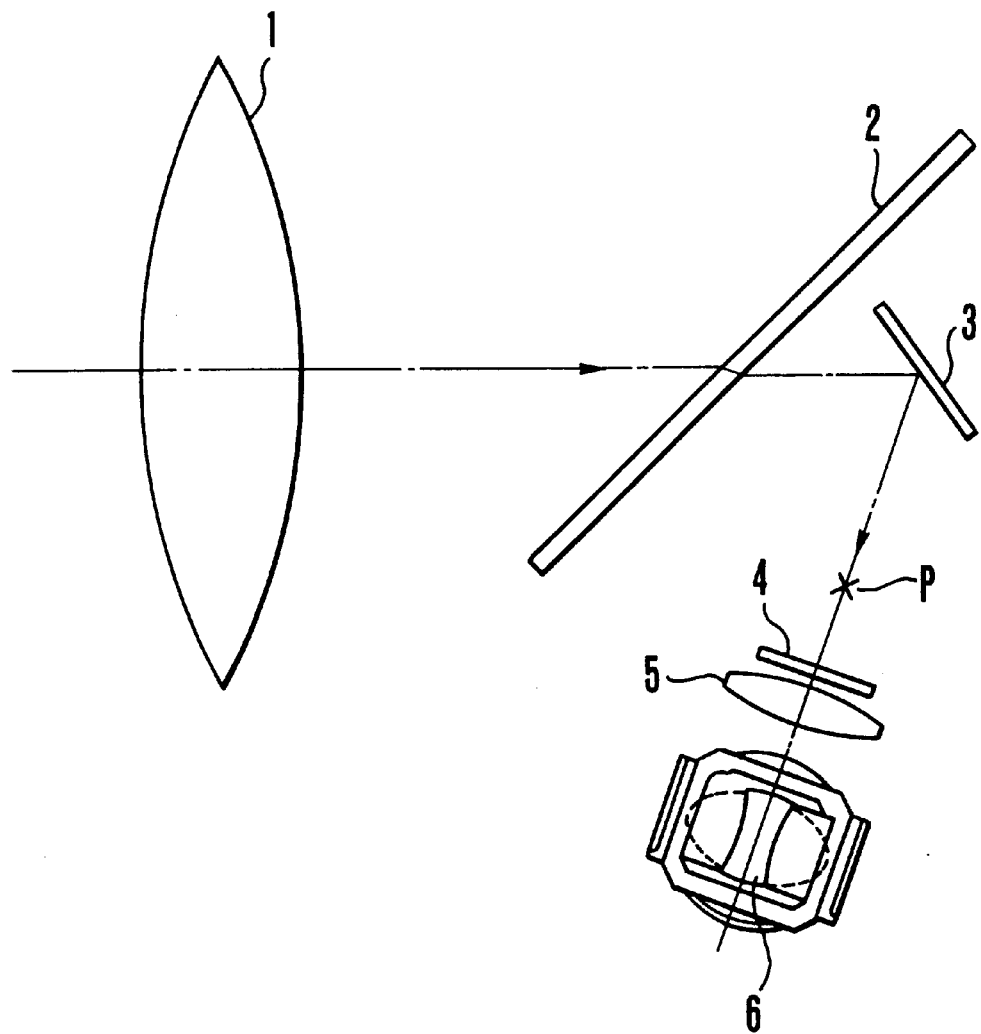
FIG. 1 is a schematic view of the AF optical system of a silver-halide camera.
Figure 2:
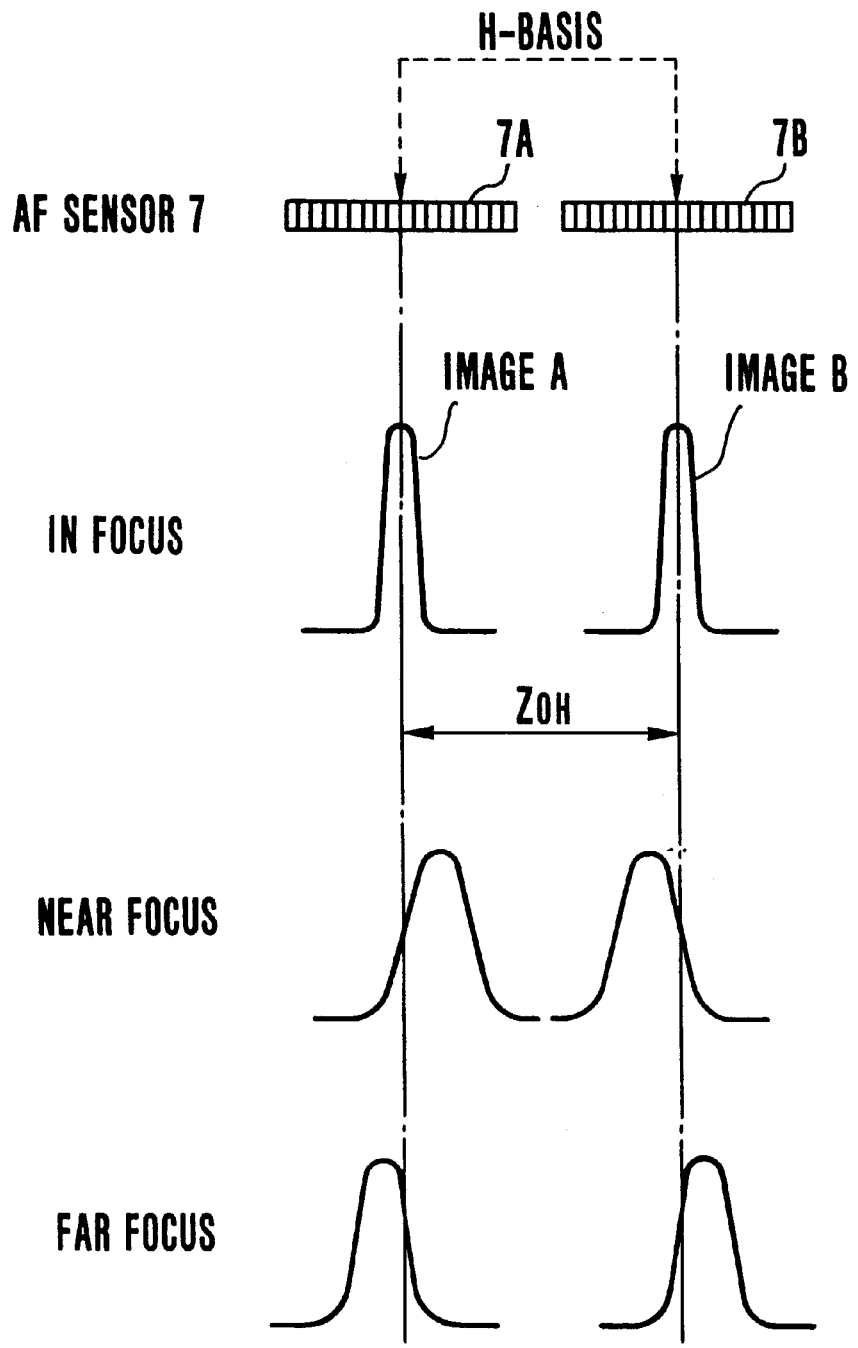
FIG. 2 is an explanatory view showing the principle of focus adjustment based on a phase-difference detection method.
Figure 3A:
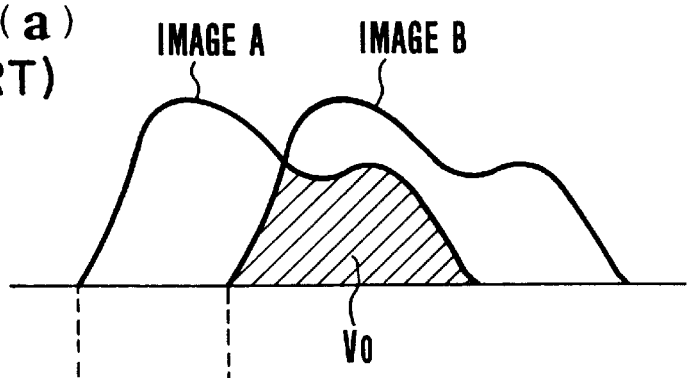
FIGS. 3(a) to 3(c) are waveform diagrams which serve to explain a calculation of the amount of correlation.
Figure 3B:
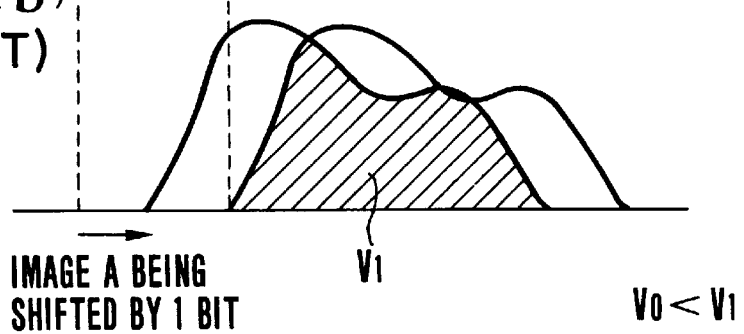
Figure 3C:
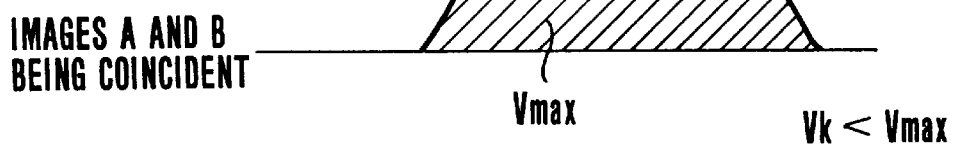

In the meantime, the light which has passed through the half-mirror 2 is reflected downward from a submirror 3. The reflected light is separated into two images A and B by a secondary imaging lens 6 of an AF optical system 15. The two images A and B are made incident on the AF sensor 7 shown in FIG. 2. The output of the AF sensor 7 is applied to the system controlling part 14, and the amounts of correlation, which will be described later, are calculated to detect the amount of deviation. A lens driving device 16 causes the lens 1 to move in the direction of the optical axis on the basis of the amount of deviation, thereby bringing the lens 1 into focus.

Switches 17 and 18, an AE (automatic exposure) sensor 19, an AWB (automatic white balance) sensor 20 and other associated parts will be described in connection with a second embodiment which will be described later.

The calculation of the amounts of correlation performed in the automatic focusing device according to the present invention will be described below.

Figure 6:
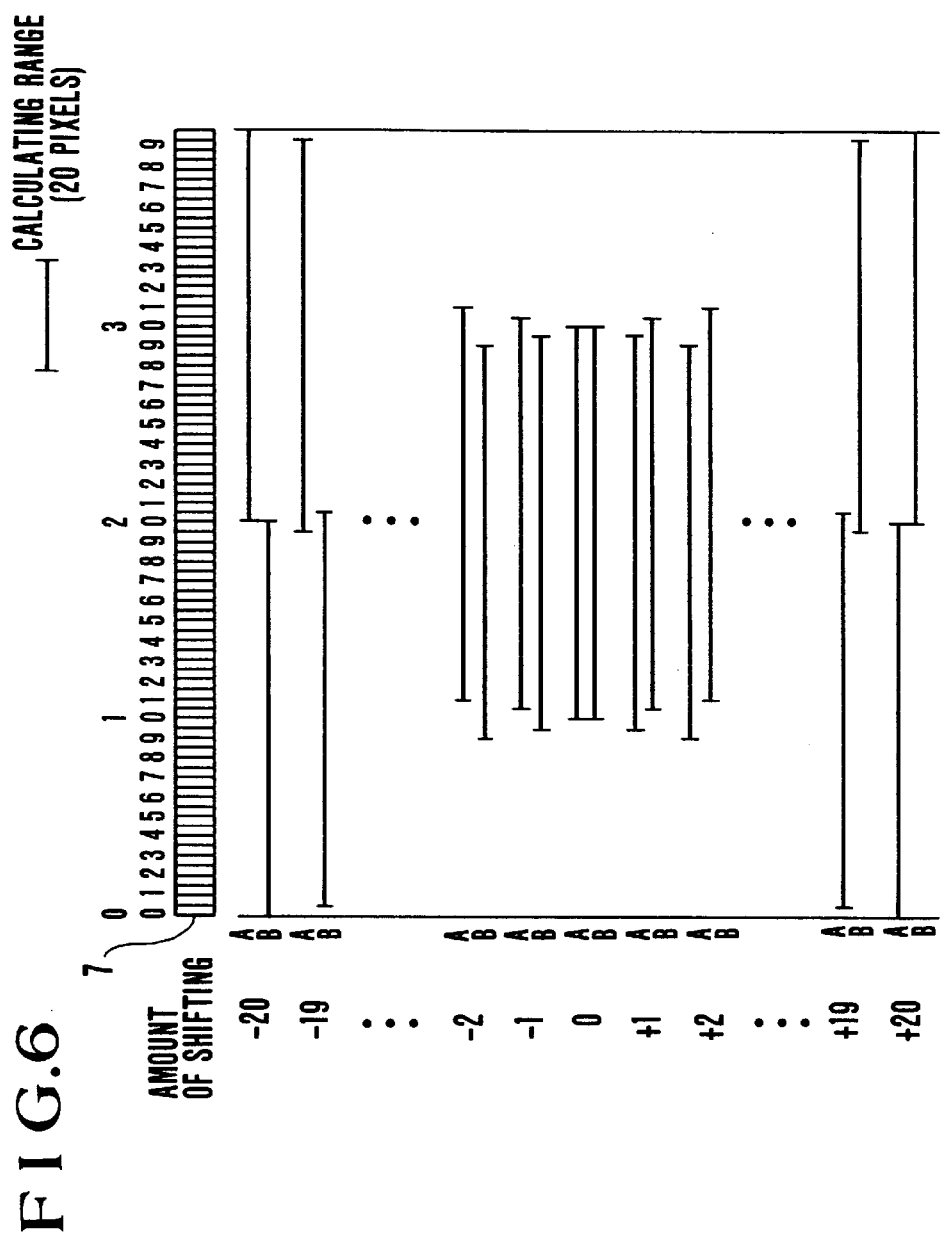
FIG. 6 is an explanatory view showing a method for calculating the amount of correlation in accordance with each of the embodiments of the present invention.

If the number of pixels of the AF sensor 7 is, for example, 40, a first calculation for obtaining the amounts of correlation is performed on the basis of the following conditions: the number of pixels to be handled in the first calculation is 20 and the amount of shifting is ±20 bits, and the amounts of correlation, "$V_0$", "$V_1$", "$V_2$", . . . and "$V_{39}$", are calculated by using the following expressions and as illustratively shown in FIG. 6:

$$V_0 = \sum_{j=1}^{20} \min(A[j+20], B[j])$$

$$V_1 = \sum_{j=1}^{20} \min(A[j+20], B[j+1])$$

$$V_2 = \sum_{j=1}^{20} \min(A[j+19], B[j+1])$$

$$\vdots$$

$$V_{39} = \sum_{j=1}^{20} \min(A[j], B[j+20]).$$

Figure 4:
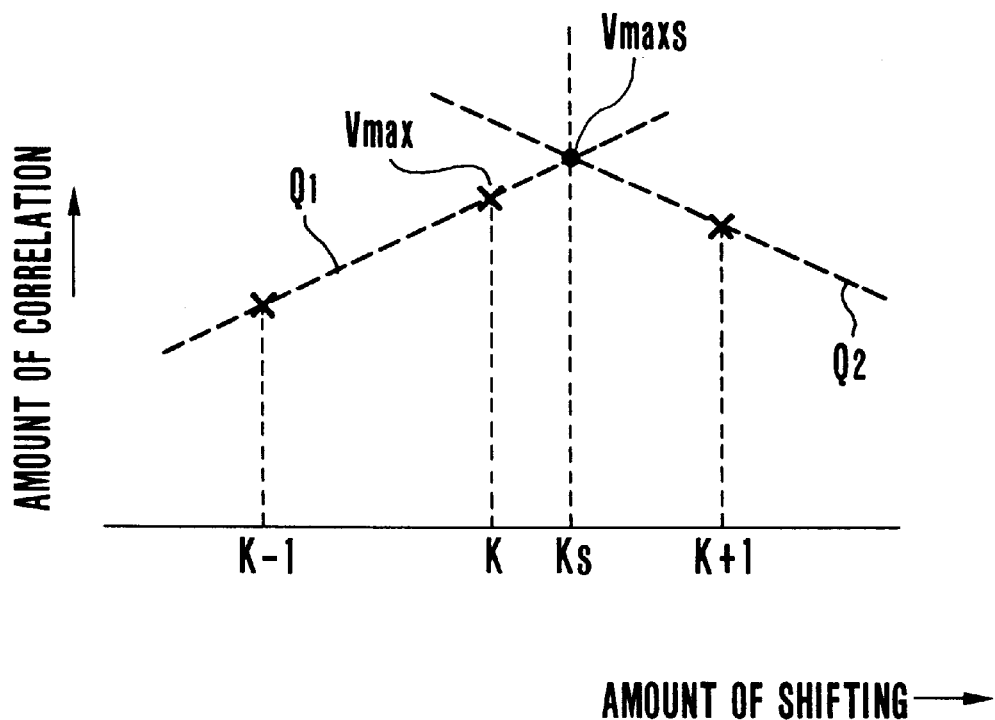
FIG. 4 is a characteristic chart aiding in explaining an interpolation method for obtaining the maximum value of the amount of correlation.

Then, the maximum value $V_{max}$ is obtained from the amounts of correlation, "$V_0$" to "$V_{39}$", which have been obtained in the above-described manner, and the true maximum value $V_{maxs}$ is obtained from the amounts of correlation immediately before and after the maximum value $V_{max}$ by performing the interpolation method of FIG. 4. Further, the associated true amount of shifting, i.e., the amount of deviation, "Ks", is obtained. In the calculation performed in this case, as compared to the first calculation described previously in connection with the silver-halide camera (FIG. 7), the number of pixels is made small and the amount of shifting is made large. Accordingly, if the lens 1 is driven in the direction of an in-focus position in accordance with the obtained amount of defocus, at least a small-defocus state is reached.

Figure 7:
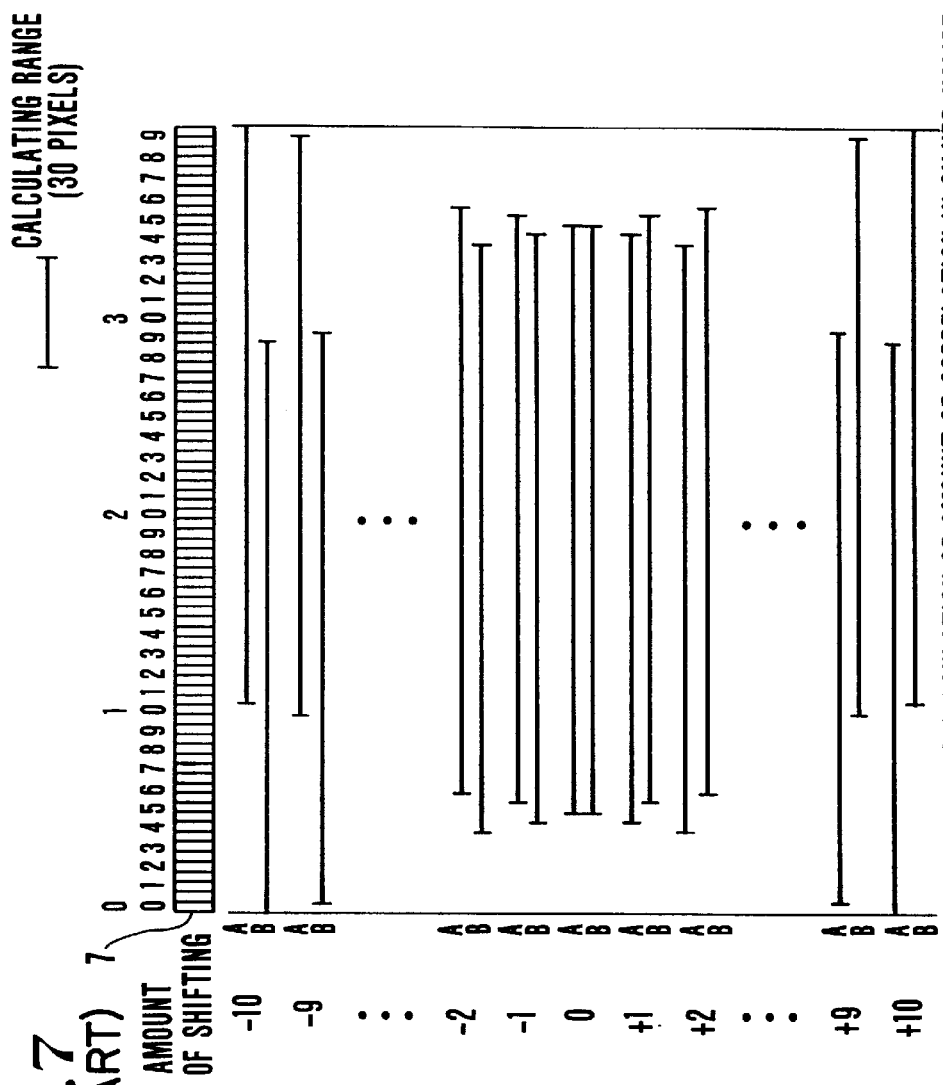
FIG. 7 is an explanatory view showing a method for calculating the amount of correlation in the case of each of the embodiments of the present invention and in the case of the silver-halide camera.

Then, data is again obtained from the AF sensor 7 to perform a second calculation. Since at least the small-defocus state is reached at this time, the number of pixels to be handled in the second calculation is increased to 30, while the amount of shifting is decreased to ±10 bits, as shown in FIG. 7. In other words, the second calculation is performed by using the same number of pixels and the same amount of shifting as those used in the first calculation described previously in connection with the silver-halide camera. On the basis of the result of the second calculation, focus can be finely adjusted or whether an in-focus state has been achieved can be confirmed.

According to the first embodiment, since the first calculation is performed on the basis of a smaller number of pixels and a larger amount of shifting, it is possible to easily detect a large-defocus state without the need to perform an unnecessary calculation.

A second embodiment of the present invention will be described below.

In the still-image recording apparatus shown in FIG. 5, correcting data relative to AE control by the AE sensor 19 or AWB control by the AWB sensor 20 are stored and held in an E²PROM. If an AF system is to be introduced into such an apparatus, correcting data relative to AF control also needs to be held in the E²PROM.

However, since general E²PROMs are limited in storage capacity at present, it is impossible to store all the required data into a single E²PROM. One method for solving this problem is to provide an external E²PROM in the microcomputer of the system controlling part 14. However, this method leads to other problems such as an increase in circuit scale.

The second embodiment is intended to solve the above-described problems and is arranged in such a manner that data which have conventionally been held in the E²PROM, such as correcting data relative to AE, AWB and AF, are recorded on the recording medium 13 of the recording device 12, such as a fixed magnetic recording medium or a semiconductor memory device.

Referring to FIG. 5, when the switch 17 is depressed, the system controlling part 14 reads correcting data from the recording medium 13 and writes it to a RAM of the built-in microcomputer. Then, the system controlling part 14 receives output data from the AF sensor 7, corrects the received data on the basis of the correcting data, and performs a calculation of the amount of deviation, thereby causing the lens 1 to move on the basis of the calculated amount of deviation. Then, when the switch 18 is depressed after an AE calculation and an AWB calculation have been performed, the aperture of the diaphragm 8 is reduced and the shutter 9 is actuated to supply video data from the image sensor 10. The video data is processed by the signal processing circuit 11, and the output of the signal processing circuit 11 is recorded on the recording medium 13 through the recording device 12.

In the above-described manner, correcting data relative to AF and others are recorded on the fixed magnetic recording medium or the semiconductor memory device, and, during photography, the recorded correcting data are selectively read out for the purpose of performing predetermined correction. Accordingly, it is not necessary to incorporate an E²PROM for storing the correcting data.

A third embodiment of the present invention will be described below.

Figure 8:
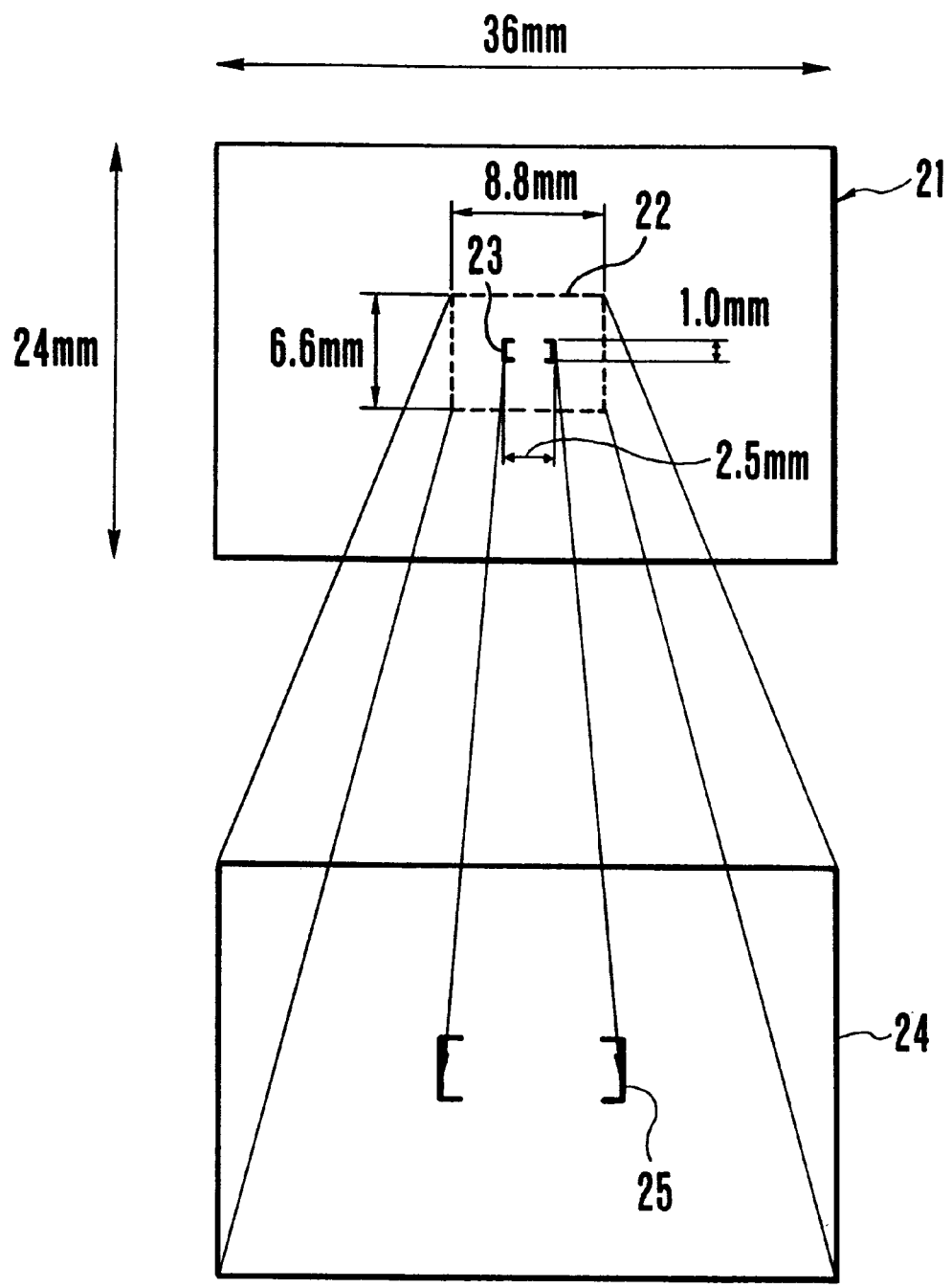
FIG. 8 is a view aiding in explaining problems to be solved by third and fourth embodiments of the present invention.

In the still-image recording apparatus shown in FIG. 5, the image sensor 10 is disposed at a location corresponding to the film plane of a silver-halide camera. As shown in FIG. 8, a 35-mm silver-halide film covers a photographic area 21 having a height of 24 mm×a width of 36 mm, whereas the image sensor 10 of, for example, a ⅔ inch-sized type, has a photographic area 22 having a height of 6.6 mm×a width of 8.8 mm. Accordingly, as compared to the 35-mm silver-halide film, the photographic area 22 of the image sensor 10 is approximately ¼ in both height and width and approximately 1/15 in size. For this reason, if a lens and an AF optical system commonly used in the silver-halide camera are used as the lens 1 and the AF optical system 15, the pitch of the pixels of the AF sensor 7 becomes relatively coarse, with the result that AF accuracy may be degraded. Further, since a focus detecting area 23 becomes relatively wide, a cause which lowers the ratio of focus detection, such as a contention between far focus and near focus, may easily occur.

Incidentally, in FIG. 8, reference numeral 24 denotes a photographic area which can be covered by the image sensor 10 if the image sensor 10 is used to photograph a scene at an angle of view equivalent to the angle of view of the silver-halide camera. Reference numeral 25 denotes a focus detecting area relative to the photographic area 24.

The third embodiment is intended to solve the above-described problems and makes it possible to utilize a lens and an AF optical system substantially identical to those used for the 35-mm silver-halide camera, thereby achieving an AF system for a still-image recording apparatus which can exhibit a focus detection capability approximately equivalent to that of the 35-mm silver-halide camera. To implement the third embodiment, the still-image recording apparatus employs an AF sensor having a pixel pitch which is relatively equivalent to that of the 35-mm silver-halide camera.

Figure 9:
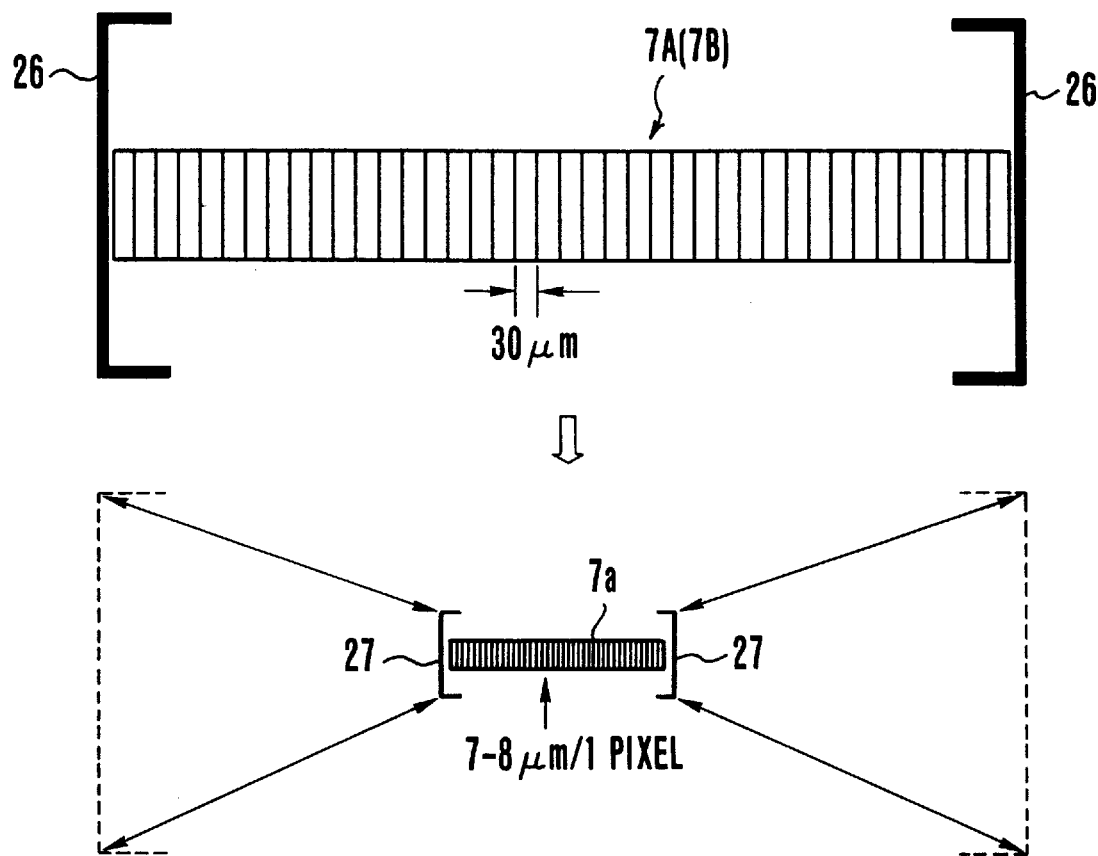
FIG. 9 is a schematic diagram showing the third embodiment of the present invention.

In FIG. 9, it is assumed that the sensor element 7A (or 7B) of the AF sensor 7 used in the silver-halide camera has 40 pixels and a 30-μm pixel pitch. If the image sensor 10 of ⅔ inch size is to be used, an AF sensor 7a of 7 to 8-μm pitch is used since the height and the width are both approximately ¼. In FIG. 9, reference numerals 26 and 27 denote focus detecting area marks. If such AF sensor 7a is used within the photographic area 24 covered by the angle of view of the image sensor 10 which is equivalent to the angle of view of the silver-halide camera, it is possible to make the proportion of the focus detecting area to the picture size of the still-image recording apparatus substantially equivalent to that of the focus detecting area to the picture size of the silver-halide camera. Accordingly, it is possible to achieve substantially equivalent AF accuracy even if a lens and an AF optical system substantially identical to those used for the 35-mm silver-halide camera are utilized in the still-image recording apparatus. Since the size of the focus detecting area is prevented from being enlarged, the probability that a contention between far focus and near focus will occur can be made substantially equal to the case of the silver-halide camera, whereby it is possible to prevent the focus detection capability from being degraded if a lens and an AF optical system for the 35-mm silver-halide camera is used with the still-image recording apparatus.

A fourth embodiment of the present invention will be described below.

The fourth embodiment is intended to solve problems identical to those solved by the third embodiment, and employs an AF optical system having a magnification which is set so that the photographic area, i.e., the pixel pitch, of the AF sensor of the still-image recording apparatus can be made substantially equivalent to that of the silver-halide camera even if the angle of view of the still-image recording apparatus is relatively equivalent to the angle of view of the silver-halide camera and even if the AF sensor is substantially identical to that used in the silver-halide camera.

If it is assumed that the magnification of image of the AF optical system in the silver-halide camera is 0.355 and that the size of the image sensor 10 is ⅔ inch, since the image ratio of the image sensor 10 to silver-halide film is 3.39, the fourth embodiment employs the AF optical system 15 which is arranged so that its magnification of image V becomes as follows (in this case, 0.664):

$$V = \begin{array}{c} \text{Magnification of Image} \\ \text{by } AF \text{ Optical System} \\ \text{in Use of Silver-} \\ \text{Halide Film} \end{array} \times \sqrt{\begin{array}{c} \text{Image Ratio of Image Sensor to} \\ \text{Silver-Halide Film} \end{array}}$$

Accordingly, if it is assumed that the angle of view of the still-image recording apparatus is equivalent to the angle of view of the silver-halide camera, it is possible to make the focusing detecting area, i.e., the pixel pitch, of the AF sensor 7 substantially equivalent to that of the silver-halide camera. As the AF optical system 15, it is possible to selectively employ, for example, the following AF optical systems: an AF optical system whose magnification of image is 0.782, in the case of the image sensor 10 of ½ inch size; an AF optical system whose magnification of image is 0.888, in the case of the image sensor 10 of ⅓ inch size; and an AF optical system whose magnification of image is 0.554, in the case of the image sensor 10 of 1 inch size.

According to the above-described arrangement, it is possible to make the proportion of the focus detecting area to the picture size of the still-image recording apparatus substantially equivalent to that of the focus detecting area to the picture size of the silver-halide camera. Accordingly, it is possible to achieve substantially equivalent AF accuracy. Since the size of the focus detecting area is prevented from being enlarged, the probability that a contention between far focus and near focus will occur can be made substantially equal to the case of the silver-halide camera, whereby it is possible to prevent the focus detection capability from being degraded.

As is apparent from the foregoing description, in the case of still-image photography by an image sensor, the following sequence is executed. First, the amounts of correlation are calculated by using a smaller number of pixels and a larger amount of shifting, and the lens is driven on the basis of the result of this calculation. After the lens has been driven, since at least a small-defocus state is reached when the amounts of correlation are to be again calculated, the amounts of correlation are calculated by using a larger number of pixels and a smaller amount of shifting, whereby focus is finely adjusted or whether an in-focus state has been achieved is confirmed. Accordingly, it is possible to facilitate detection of a large-defocus state, and it is also possible to achieve advantages, such as the advantage that it is possible to omit the processing of calculating the amounts of correlation required to detect an initial small-defocus state which has been carried out in the silver-halide camera.

What is claimed is:

1. An automatic focusing device of phase-difference detection type, in which a focus state is detected by detecting deviation between two incident images, comprising:
   a) image sensing means composed of two sensor portions for receiving two images each variable in their image forming positions according to the focus state,
   b) correlation computing means for computing correlation between output signals from the two sensor portions by relatively shifting the output signals with a predetermined pitch,
   c) driving means for driving a focus lens to an in-focus point according the outputs of the correlation computing means, and
   d) control means for changing a predetermined range with which the output signals of the two sensor portions are shifted and a unit of a shifting pitch between the two sensor portions between a rough focus detecting mode and a high accuracy focus detecting mode and changing shiftable ranges of the two sensor portions for computing the correlation on the image sensing means so that a number of pixels of the sensor portions operable in the high accuracy focus detecting mode is larger than that in the rough focus detecting mode and the unit of the shifting pitch in the high accuracy focus detecting mode is smaller than in the rough focus detecting mode.

2. A device according to claim 1, wherein said control means controls the correlation computing means to perform AF operation plural times.

3. A device according to claim 2, wherein said correlation computing means performs the correlation computation by shifting the output signals of the two sensor portions with the predetermined pitch and determines a maximum correlation value obtained by the correlation computation as an evaluation value for the focus state.

4. An automatic focusing device, comprising:
   a) image sensing means,
   b) focal point detecting means for detecting a focus state,
   c) recording means for recording image information sensed by the image sensing means and recording correction data for correcting characteristics of the focal point detecting means, d) correction means for reading out the correction data for correcting the characteristics of the focal point detecting means recorded beforehand in the recording means to correct the characteristics of the focal point detecting means, and e) control means for driving a focus lens to an in-focus point according to outputs of the focal point detection means corrected by the correction means.

5. A device according to claim 4, wherein the focal point detecting means includes an AF sensor, and the correction data is for correcting the output signal of the AF sensor.

6. A device according to claim 5, further comprising automatic exposure control means, automatic white balance control means, wherein the correction data includes correction data for correcting the automatic exposure control means and the automatic white balance control means.

7. A device according to claim 4, wherein the recording means is a magnetic recording means.

8. A device according to claim 4, wherein the recording means is a semi-conductor memory.

9. A device according to claim 4, wherein the control means includes a microcomputer and reads out the correction data from the recording means prior to the operation of the focal point detection means and memorizes the data in the microcomputer to correct a focal point detection information input from the focal point detecting means.

10. An automatic focusing device, comprising:

sensor means having two sensing areas for receiving two images respectively;

focus detecting means for detecting phase difference between the two images and computing correlation of the two images as focus evaluating value;

driving means for driving a focus lens to an in-focus position on the basis of the focus evaluating value output from said focus detecting means; and focus control means for changing each size of the two sensing areas and a unit of a shifting pitch between the two sensing areas between a first mode for roughly detecting a focus condition and a second mode for accurately detecting the focus condition so that a number of pixels of each of two sensing areas in the second mode is larger than that in the first mode and the unit of the shifting pitch in the second mode is smaller than that in the first mode.

11. A device according to claim 10, wherein said focus detecting means computes the correlation of the two images by shifting one of the two images relative to the other of the two images and computing the difference of the two images.

12. A device according to claim 11, wherein said focus control means causes said focus detecting means to execute a first focus detecting operation in the first mode and successively execute a second focus detecting operation in the second mode.

* * * * *